United States Patent
Yan et al.

(10) Patent No.: US 11,734,862 B2
(45) Date of Patent: Aug. 22, 2023

(54) SYSTEMS AND METHODS FOR IMAGE RECONSTRUCTION

(71) Applicant: SHANGHAI UNITED IMAGING HEALTHCARE CO., LTD., Shanghai (CN)

(72) Inventors: Jing Yan, Shanghai (CN); Wanli Teng, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 105 days.

(21) Appl. No.: 16/886,962

(22) Filed: May 29, 2020

(65) Prior Publication Data

US 2020/0294283 A1    Sep. 17, 2020

Related U.S. Application Data

(63) Continuation of application No. PCT/CN2018/118561, filed on Nov. 30, 2018.

(30) Foreign Application Priority Data

Nov. 30, 2017  (CN) .......................... 201711242863.X

(51) Int. Cl.
*G06T 11/00* (2006.01)
*G06T 7/00* (2017.01)

(52) U.S. Cl.
CPC .......... *G06T 11/006* (2013.01); *G06T 7/0012* (2013.01); *G06T 2207/10064* (2013.01);
(Continued)

(58) Field of Classification Search
CPC ......... G06T 11/006; G06T 2207/10064; G06T 2207/10081; G06T 2207/30004;
(Continued)

(56) References Cited

U.S. PATENT DOCUMENTS 5,053,958 A * 10/1991 Tam ..................... G06T 11/006
378/4
8,559,596 B2 * 10/2013 Thomson ............. A61N 5/1067
378/65

(Continued)

FOREIGN PATENT DOCUMENTS

CN    103325141 A    9/2013
CN    104504743 A    4/2015

(Continued)

OTHER PUBLICATIONS

Emil Y Sidky and Xiaochuan Pan, Image reconstruction in circular cone-beam computed tomography by constrained, total-variation minimization, 2008 Phys. Med. Biol. 53, p. 4777-4807 (Year: 2008).*

(Continued)

*Primary Examiner* — Gandhi Thirugnanam
(74) *Attorney, Agent, or Firm* — Metis IP LLC

(57) ABSTRACT

A method for image reconstruction may include obtaining projection data $D_0$ generated by an imaging device by scanning an object at first angles, wherein the first angles may be a subset of second angles. The second angles may include at least short-scan angles for a system to conduct image reconstruction. The method may also include generating an image $F_1$ based on the projection data $D_0$. The method may also include determining, based on the image $F_1$, projection data $D_1$ corresponding to third angles that are a subset of the second angles and different from the first angles. The method may also include generating a final image associated with the object by performing an iteration process including one or more iterations using initial data including the image $F_1$, the projection data $D_0$, and the projection data $D_1$.

14 Claims, 8 Drawing Sheets

(52) U.S. Cl.
CPC .............. *G06T 2207/10081* (2013.01); *G06T 2207/30004* (2013.01); *G06T 2211/421* (2013.01); *G06T 2211/424* (2013.01)

(58) Field of Classification Search
CPC ......... G06T 2211/421; G06T 2211/424; G06T 2211/436; G06B 7/0012
See application file for complete search history.

(56) References Cited

U.S. PATENT DOCUMENTS

| | | | | |
|---|---|---|---|---|
| 8,605,975 | B2* | 12/2013 | Pan | G06T 11/005 382/130 |
| 9,600,924 | B2* | 3/2017 | Noo | G06T 7/0012 |
| 10,489,939 | B2* | 11/2019 | Xing | G06T 7/0012 |
| 2004/0066910 | A1* | 4/2004 | De Villiers | G06T 11/005 378/7 |
| 2007/0195923 | A1* | 8/2007 | Netsch | G06T 11/005 378/4 |
| 2010/0246751 | A1* | 9/2010 | Bruder | G06T 11/006 378/4 |
| 2011/0044546 | A1* | 2/2011 | Pan | G06T 11/006 382/195 |
| 2011/0268335 | A1* | 11/2011 | Kunze | A61B 6/5288 382/131 |
| 2012/0020448 | A1* | 1/2012 | Khare | G06T 11/006 378/4 |
| 2013/0108128 | A1* | 5/2013 | Yu | G06T 11/006 382/131 |
| 2013/0293917 | A1* | 11/2013 | Safonov | H04N 1/00432 358/1.13 |
| 2014/0298153 | A1* | 10/2014 | Tsujimoto | G06F 3/04845 715/232 |
| 2017/0169586 | A1* | 6/2017 | Ding | G06T 11/003 |
| 2018/0182129 | A1* | 6/2018 | Xing | G06T 7/0012 |
| 2019/0114815 | A1* | 4/2019 | Erhard | G06T 11/008 |
| 2020/0294283 | A1* | 9/2020 | Yan | G06T 7/0012 |
| 2021/0239863 | A1* | 8/2021 | Tavitian | G06T 11/008 |

FOREIGN PATENT DOCUMENTS

| | | | | |
|---|---|---|---|---|
| CN | 105354868 | A | | 2/2016 |
| CN | 106373165 | A | | 2/2017 |
| CN | 108010096 | A | * | 5/2018 ........... G06T 11/006 |
| CN | 112446931 | A | * | 3/2021 |
| WO | 2019105460 | A1 | | 6/2019 |

OTHER PUBLICATIONS

Hu, Fangqiu et al., Reconstruction of a three-dimensional model based on C-arm two-dimensional projections, Chinese Journal of Tissue Engineering Research, 16(13): 2435-2438, 2012.
International Search Report in PCT/CN2018/118561 dated Mar. 1, 2019, 4 pages.
Written Opinion in PCT/CN2018/118561 dated Mar. 1, 2019, 5 pages.
First Office Action in Chinese Application No. 201711242863.X dated Oct. 8, 2019, 20 pages.

\* cited by examiner

SYSTEMS AND METHODS FOR IMAGE RECONSTRUCTION

CROSS-REFERENCE TO RELATED APPLICATIONS

This application a Continuation of International Application No. PCT/CN2018/118561, filed on Nov. 30, 2018, which claims priority to Chinese Patent Application No. 201711242863.X, filed on Nov. 30, 2017, the contents of which are hereby incorporated by reference in their entirety.

TECHNICAL FIELD

The present disclosure generally relates to image processing, and more particularly, to systems and methods for image reconstruction related to cone beam computed tomography (CBCT).

BACKGROUND

Computed tomography (CT) techniques, such as cone beam computed tomography (CBCT), are widely used in clinical examinations and medical diagnoses in recent years. During a scan of a subject (e.g., a patient) using a CT scanner, the radiation source and the detector of the CT scanner may rotate with the gantry around the subject to scan the subject at a plurality of gantry angles. Then a plurality of projection images corresponding to the gantry angles may be generated based on the scan data. However, the more scan data acquired by the CT scanner, the greater radiation dosage received by the patient, which is harmful to the patient. In order to reduce the radiation dosage received by the patient, the CT scanner may acquire scan data corresponding to fewer gantry angles in a scan. However, there are some problems in existing methods for generating images based on the scan data corresponding to fewer gantry angles including, for example, a poor image quality, low efficiency, and a complicated calculation. Accordingly, it is desirable to provide methods and systems for image reconstruction to efficiently generate images with a high image quality based on scan data corresponding to fewer gantry angles.

SUMMARY

According to a first aspect of the present disclosure, a system for image reconstruction may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain projection data $D_0$ generated by an imaging device by scanning an object at first angles, wherein the first angles may be a subset of second angles. The second angles may include at least short-scan angles for the system to conduct image reconstruction. The one or more processors may generate an image $F_1$ based on the projection data $D_0$. The one or more processors may determine, based on the image $F_1$, projection data $D_1$ corresponding to third angles that are a subset of the second angles and different from the first angles. The one or more processors may generate a final image associated with the object by performing an iteration process including one or more iterations using initial data including the image $F_1$, the projection data $D_0$, and the projection data $D_1$.

In some embodiments, an $i_{th}$ iteration of the one or more iterations may include: generating an image $F_{2i}$ based on the projection data $D_0$ and projection data $D_i$ corresponding to the third angles; generating an image $F_{2i+1}$ based on the image $F_{2i}$; and determining projection data $D_{i+1}$ corresponding to the third angles based on the image $F2_{i+1}$. To generate the final image associated with the object by performing the iteration process including the one or more iterations using the initial data including the image $F_1$, the projection data $D_0$, and the projection data $D_1$, the one or more processors may generate the final image based on the image $F_{2i+1}$ generated in an iteration of the one or more iterations satisfying a termination condition.

In some embodiments, the determining of the projection data $D_{i+1}$ corresponding to the third angles may include determining the projection data $D_{i+1}$ based on the image $F_{2i+1}$ using a forward projection algorithm.

In some embodiments, the $i_{th}$ iteration may further include determining whether the image $F_{2i+1}$ generated satisfies the termination condition.

In some embodiments, the determining of whether the image $F_{2i+1}$ satisfies the termination condition may include determining projection data $D_{0i}$ corresponding to the first angles based on the image $F_{2i+1}$; determining a difference between the projection data $D_{0i}$ and the projection data $D_0$; and determining whether the difference between the projection data $D_{0i}$ and the projection data $D_0$ is less than a difference threshold, wherein the termination condition includes that the difference between the projection data $D_{0i}$ and the projection data $D_0$ is less than the difference threshold.

In some embodiments, the image $F_{2i}$ may be generated based on the projection data $D_0$ and projection data $D_i$ using an algebraic iterative algorithm.

In some embodiments, the algebraic iterative algorithm may include an algebraic reconstruction technique (ART) or a simultaneous algebraic reconstruction technique (SART).

In some embodiments, the generating of the image $F_{2i+1}$ based on the image $F_{2i}$ may include generating the image $F_{2i+1}$ by minimizing a total variation (TV) relating to the image $F_{2i}$.

In some embodiments, minimizing the TV relating to the image $F_{2i}$ may be via a steepest descent algorithm.

In some embodiments, to generate the image $F_1$ based on the projection data $D_0$, the one or more processors may generate the image $F_1$ based on the projection data $D_0$ using an analytical reconstruction algorithm.

In some embodiments, the analytical reconstruction algorithm may include a filtered back projection (FBP) algorithm or a Feldkamp-Davis-Kress (FDK) algorithm.

In some embodiments, the system may be a Cone-beam imaging system at least including a CBCT system at least including a C-arm X-ray fluoroscopy system.

According to another aspect of the present disclosure, a method for image reconstruction may include one or more of the following operations. One or more processors may obtain projection data $D_0$ generated by an imaging device by scanning an object at first angles, wherein the first angles may be a subset of second angles. The second angles may include at least short-scan angles for a system to conduct image reconstruction. The one or more processors may generate an image $F_1$ based on the projection data $D_0$. The one or more processors may determine, based on the image $F_1$, projection data $D_1$ corresponding to third angles that are a subset of the second angles and different from the first angles. The one or more processors may generate a final image associated with the object by performing an iteration process including one or more iterations using initial data including the image $F_1$, the projection data $D_0$, and the projection data $D_1$.

According to yet another aspect of the present disclosure, a system for image reconstruction may include an acquisition module configured to obtain projection data $D_0$ generated by an imaging device by scanning an object at first angles, wherein the first angles are a subset of second angles. The second angles may include at least short-scan angles for the system to conduct image reconstruction. The system may also include a first reconstruction module configured to generate an image $F_1$ based on the projection data $D_0$. The system may also include a determination module configured to determine, based on the image $F_1$, projection data $D_1$ corresponding to third angles that are a subset of the second angles and different from the first angles. The system may also include a second reconstruction module configured to generate a final image associated with the object by performing an iteration process including one or more iterations using initial data including the image $F_1$, the projection data $D_0$, and the projection data $D_1$.

According to yet another aspect of the present disclosure, a non-transitory computer readable medium may comprise at least one set of instructions for image reconstruction. The at least one set of instructions may be executed by one or more processors of a computer server. The one or more processors may obtain projection data $D_0$ generated by an imaging device by scanning an object at first angles, wherein the first angles may be a subset of second angles. The second angles may include at least short-scan angles for a system to conduct image reconstruction. The one or more processors may generate an image $F_1$ based on the projection data $D_0$. The one or more processors may determine, based on the image $F_1$, projection data $D_1$ corresponding to third angles that are a subset of the second angles and different from the first angles. The one or more processors may generate a final image associated with the object by performing an iteration process including one or more iterations using initial data including the image $F_1$, the projection data $D_0$, and the projection data $D_1$.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
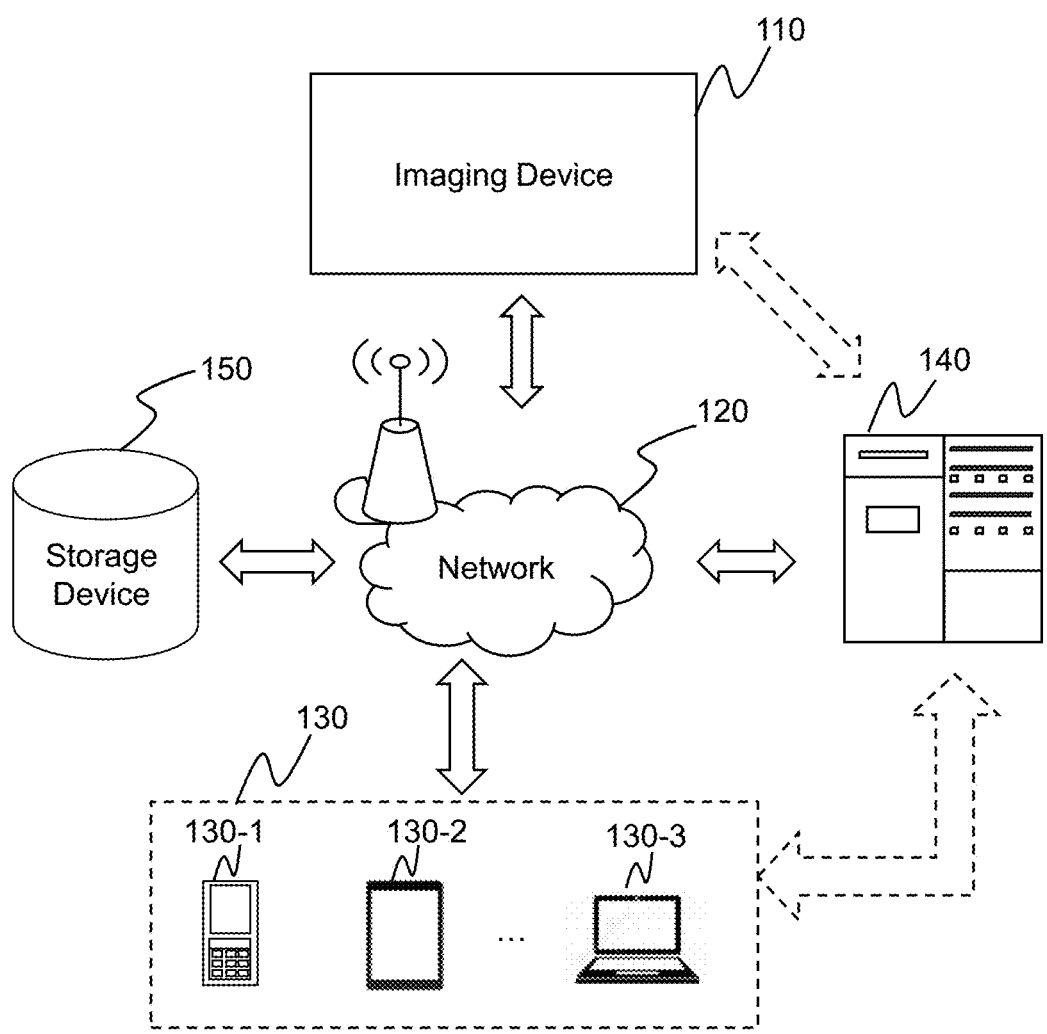
FIG. 1A is a schematic diagram illustrating an exemplary medical imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices (e.g., CPU 220 illustrated in FIG. 2) may be provided on a computer-readable medium, such as a compact disc, a digital video disc, a flash drive, a magnetic disc, or any other tangible medium, or as a digital download (and can be initially stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. As used in the present disclosure, terms "angle," "scan angle," and "gantry angle" may be used interchangeably.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for CBCT image reconstruction. In the methods, a CBCT scanner may scan a patient at incomplete gantry angles and acquire projection data $D_0$ corresponding to such incomplete gantry angles. A processing device of the systems may generate an image $F_1$ by processing the projection data $D_0$ using an analytical reconstruction algorithm. The processing device may determine projection data $D_1$ corresponding to missing gantry angles based on the $F_1$. The processing device may generate a final image by performing an iteration process in which the image $F_1$, the projection data $D_0$, and the projection data $D_1$ is used as initial data. In the iteration process, the processing device may use a total variation algorithm to improve the quality of the final image. The projection data $D_1$ corresponding to the missing gantry angles may be updated in each iteration of the iteration process. Using the image $F_1$, the projection data $D_0$, and the projection data $D_1$ as the initial data, the total variation algorithm, and/or updating the projection data $D_1$ may mitigate the negative effect of missing projection data on the reconstruction of the final image, and improve the quality of the final image and the speed of the reconstruction of the final image, which may promote the application of CBCT in clinical examinations and medical diagnoses.

FIG. 1A is a schematic diagram illustrating an exemplary medical imaging system according to some embodiments of the present disclosure. In some embodiments, the imaging system 100 may be applied to any application scenario in which a computed tomography (CT) system is used to scan a subject and generate one or more medical images of the subject, such as a traditional CT (also referred to as fan beam CT) system, a cone beam computed tomography (CBCT) system, a computed tomography-positron emission tomography (CT-PET) system, a computed tomography-magnetic resonance imaging (CT-MRI) system, a cone beam computed tomography-radiotherapy (CBCT-RT) system, or the like, or a combination thereof.

In some embodiments, the imaging system 100 may include an imaging device 110, a network 120, one or more terminals 130, a processing device 140, and a storage device 150. The components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

In some embodiments, the imaging device 110 may include a fan beam CT scanner, a CBCT scanner, a multi-modality scanner, or the like, or a combination thereof. Exemplary CBCT scanners may include a C-arm X-ray fluoroscopy scanner. Exemplary multi-modality scanners may include a CT-PET scanner, a CT-MRI scanner, a CBCT-RT scanner, etc.

For brevity, the description of the methods and/or systems for image reconstruction in the present disclosure may take CBCT imaging as an example (e.g., the imaging device 110 may be a CBCT scanner). It should be noted that the CBCT imaging described below is merely some examples or implementations. For persons having ordinary skills in the art, the methods and/or systems for image reconstruction in the present disclosure may be applied to other similar situations, such as fan beam CT, etc.

Figure 1B:
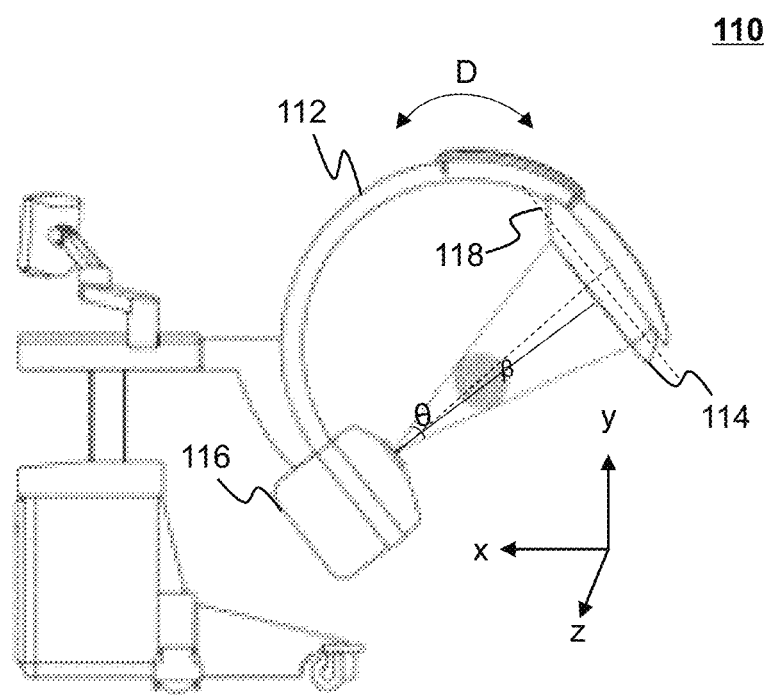
FIG. 1B is a schematic diagram illustrating an exemplary CBCT scanner according to some embodiments of the present disclosure.

In some embodiments, the imaging device 110 may be a CBCT scanner (e.g., a CBCT scanner shown in FIG. 1B). The imaging device 110 may include a gantry 112, a detector 114, and a radiation source 116. The imaging device 110 may further include a table (not shown in FIG. 1B). The detector 114 and the radiation source 116 may be oppositely mounted on the gantry 112. The detector 114 and the radiation source 116 may rotate together with the gantry 112 along, for example, direction D that is represented by an arc with the bidirectional arrow in FIG. 1B. An object may be placed on the table and moved into a space between the detector 114 and the radiation source 116 of the imaging device 110. The object may be biological or non-biological. Merely by way of example, the object may include a patient, a man-made object, etc. As another example, the object may include a specific portion, organ, and/or tissue of the patient. For example, the object may include head, brain, neck, body, shoulder, arm, thorax, cardiac, stomach, blood vessel, soft tissue, knee, feet, or the like, or any combination thereof. Alternatively, the object may be a phantom. In the present disclosure, "subject," "object," "scan subject," or "scan object" are used interchangeably.

The radiation source 116 may emit radiation rays that are divergent, forming a cone, to scan the object that is placed on the table. The radiation rays may include X-rays, γ-rays, α-rays, ultraviolet, laser, neutron, proton, or the like, or a combination thereof.

The detector 114 may receive the radiation rays passed through the object. In some embodiments, the detector 114 may include a plurality of detector units, which may be arranged in a channel direction and a row direction. The channel direction may be vertical to the rotation plane (e.g., a plane defined by the x axis and the y axis shown in FIG. 1B) of the gantry 112 (e.g., also the rotation plane of the radiation source 116 and/or the detector 114). For example, the channel direction may be parallel to the z axis shown in FIG. 1B. The row direction may be vertical to the channel direction. For example, the row direction may be parallel to line 118 in the detector 114. The detector 114 may include a scintillation detector (e.g., a cesium iodide detector) or a gas detector.

In some embodiments, the cone beams of the radiation source 116 may have a fan angle and a cone angle. The fan angle refers to an angle between two generatrix lines of a first section of the cone beams. The first section may pass through a first axis of the base of the cone beams, which is parallel to the row direction. For example, θ shown in FIG. 1B illustrates the fan angle of the cone beams of the radiation source 116. The cone angle refers to an angle between two generatrix lines of a second section of the cone beams. The second section may pass through a second axis of the base of the cone beams, which is parallel to the channel direction. For example, β shown in FIG. 1B illustrates the cone angle of the cone beams of the radiation source 116.

The network 120 may include any suitable network that can facilitate exchange of information and/or data for the imaging system 100. In some embodiments, one or more components of the imaging system 100 (e.g., the imaging device 110, the terminal 130, the processing device 140, the storage device 150) may communicate with one or more other components of the imaging system 100 via the network 120. For example, the processing device 140 may obtain projection data (e.g., generated based on the detector 114 of the imaging device 110) from the imaging device 110 via the network 120. As another example, the processing device 140 may obtain user instructions from the terminal 130 via the network 120. The network 120 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™. In some embodiments, the terminal(s) 130 may be part of the processing device 140.

In some embodiments, the processing device 140 may process data obtained from the imaging device 110, the terminal 130, or the storage device 150. For example, the processing device 140 may generate a final image based on projection data corresponding to fewer gantry angles. The processing device 140 may be a central processing unit (CPU), a digital signal processor (DSP), a system on a chip (SoC), a microcontroller unit (MCU), or the like, or any combination thereof.

In some embodiments, the processing device 140 may be a single server or a server group. The server group may be centralized or distributed. In some embodiments, the processing device 140 may be local or remote. For example, the processing device 140 may access information and/or data stored in the imaging device 110, the terminal 130, and/or the storage device 150 via the network 120. As another example, the processing device 140 may be directly connected to the imaging device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data, instructions, and/or any other information. In some embodiments, the storage device 150 may store data obtained from the imaging device 110, the terminal 130, and/or the processing device 140. For example, the storage device 150 may store images generated by the processing device 140. In some embodiments, the storage device 150 may store data and/or instructions that the processing device 140 may execute or use to perform exemplary methods described in the present disclosure. For example, the storage device 150 may store data and/or instructions that the processing device 140 may execute or use to generate a final image based on projection data corresponding to fewer gantry angles. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the processing device 140, the terminal 130). One or more components of the imaging system 100 may access the data or instructions stored in the storage device 150 via the network 120. In some embodiments, the storage device 150 may be directly connected to or communicate with one or more other components of the imaging system 100 (e.g., the processing device 140, the terminal 130). In some embodiments, the storage device 150 may be part of the processing device 140.

Figure 2:
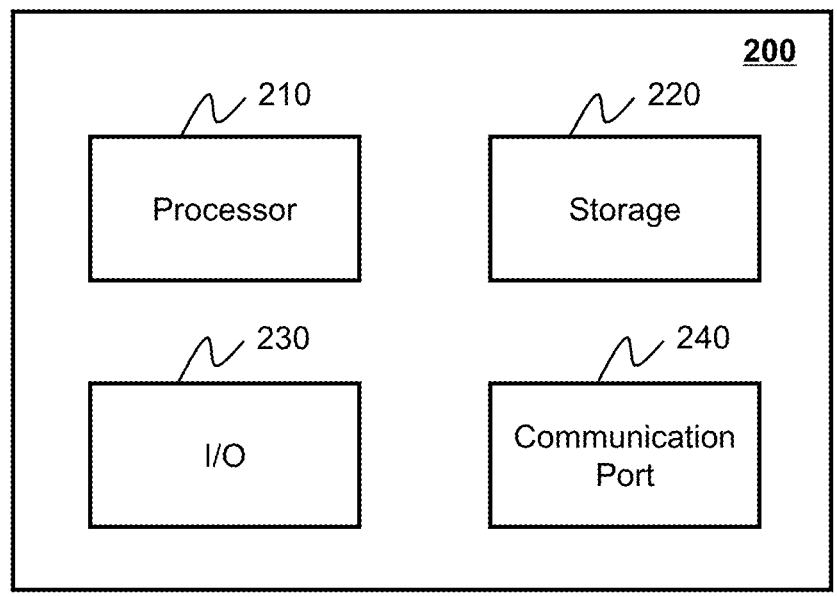
FIG. 2 is a schematic diagram illustrating hardware and/or software components of an exemplary computing device according to some embodiments of the present disclosure.

FIG. 2 is a schematic diagram illustrating hardware and/or software components of an exemplary computing device according to some embodiments of the present disclosure. As illustrated in FIG. 2, the computing device 200 may include a processor 210, a storage 220, an input/output (I/O) 230, and a communication port 240. In some embodiments, the processing device 140 may be implemented on the computing device 200.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the imaging device 110, the terminal 130, the storage device 150, and/or any other component of the imaging system 100. For example, the processor 210 may obtain projection data corresponding to fewer gantry angles from the imaging device 110 and generate a final image based on the projection data. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the imaging device 110, the terminal 130, the storage device 150, or any other component of the imaging system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program (e.g., in the form of computer-executable instructions) for the processing device 140 for generating a final image based on projection data corresponding to fewer gantry angles.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the imaging device 110, the terminal 130, or the storage device 150. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
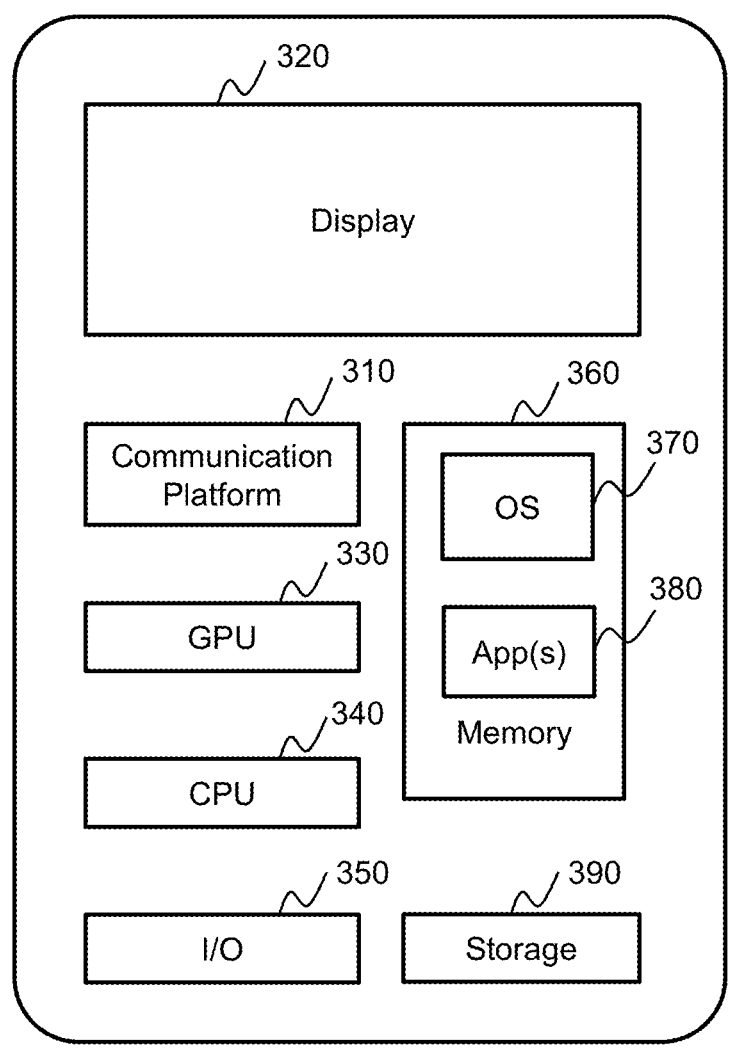
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device according to some embodiments of the present disclosure. In some embodiments, the terminal 130 may be implemented on the mobile device 300. As illustrated in FIG. 3, the mobile device 300 may include a communication module 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
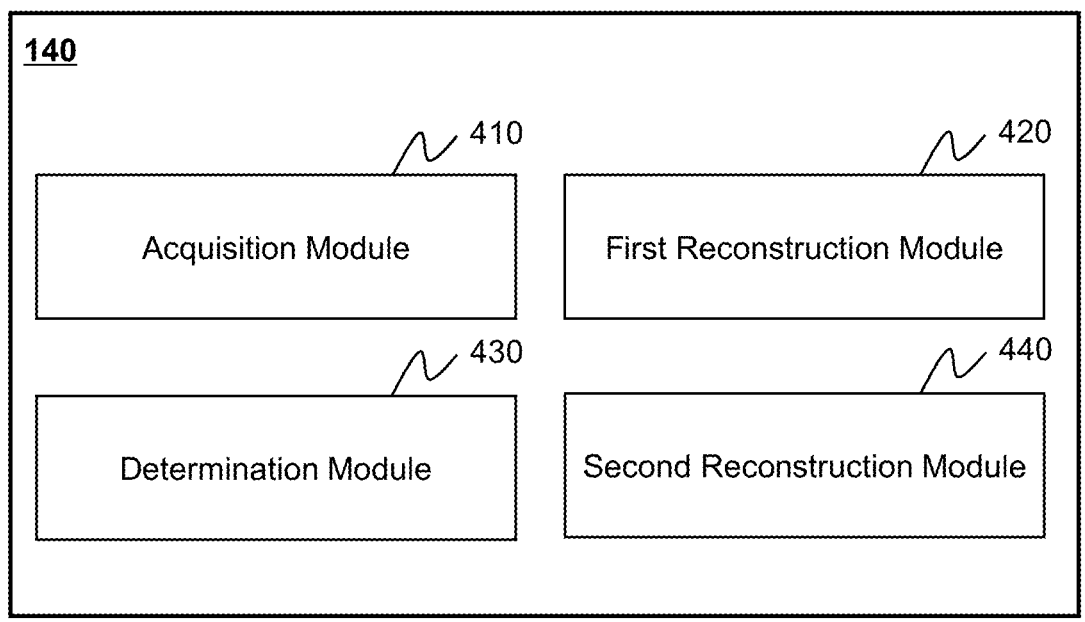
FIG. 4A is a block diagram illustrating an exemplary processing device according to some embodiments of the present disclosure.

FIG. 4A is a block diagram illustrating an exemplary processing device according to some embodiments of the present disclosure. The processing device 140 may include an acquisition module 410, a first reconstruction module 420, a determination module 430, and a second reconstruction module 440. The processing device 140 may be implemented on various components (e.g., the processor 210 of the computing device 200 illustrated in FIG. 2).

The acquisition module 410 may be configured to obtain projection data $D_0$. The projection data $D_0$ may be generated by the imaging device 110 by scanning an object at first angles, wherein the first angles may be a subset of second angles that include at least short-scan angles for the imaging system 100 to conduct image reconstruction.

During the scan process, the radiation source 116 of the imaging device 110 may rotate around the object and emit radiation rays (e.g., X-rays) at a plurality of angles. The rays may pass through the object and be received by the detector 114 of the imaging device 110. The detector 114 may transform light signals of the rays into electronic signals. The electronic signals may be transformed into digital signals (also referred to as projection data, raw data, or scan data), for example, by an analog-digital converter (ADC) of the imaging device 110. The imaging device 110 may transmit the digital signals to the processing device 140. The processing device 140 may process the digital signals to generate one or more images.

In some embodiments, if the imaging device 110 scans the object by rotating around the object and emitting radiation rays at angles in a range of at least $180°+\theta$ ($\theta$ refers to a fan angle of the rays emitted from the radiation source 116 of the imaging device 110, and $\theta \geq 0°$), the imaging device 110 may acquire complete projection data for medical image reconstruction of the imaging system 100. The angles in the range of at least $180°+\theta$ may be referred to as complete angles (also referred to as the second angles) that include at least short-scan angles for the imaging system 100 to conduct image reconstruction. Angles within the range of $180°+\theta$ may be referred to as the short-scan angles. The radiation emission may occur at second angles with an increment of less than or equal to 1°. For example, if $\theta$ is set to 20°, the second angles may include 0°, 1°, 2°, . . . , 199°, and 200°. One ordinary skilled in the art could readily know that the increment exemplified herein is for illustration purposes and not intended to be limiting.

The first angles (also referred to as incomplete angles or limited angles) may be a subset of the second angles. For example, if $\theta$ is set to 20°, the second angles may include 0°, 1°, 2°, . . . , 199°, and 200°, and the first angles may include 0°, 1°, 2°, . . . , 149°, and 150°. As another example, if $\theta$ is set to 20°, the second angles may include 0°, 1°, 2°, . . . , 199°, and 200°, and the first angles may include 0°, 2°, 4°, . . . , 198°, and 200°.

In some embodiments, the radiation received by the object when the imaging device 110 scans the object by emitting radiation rays at the first angles (or referred to as scanning at the first angles for brevity) may be less than the radiation received by the object when the imaging device 110 scans the object by emitting radiation rays at the second angles (or referred to as scanning at the second angles for brevity). However, the projection data $D_0$ (also referred to as incomplete projection data) merely corresponds to the first angles, so projection data corresponding to a part of the second angles is missing compared to the projection data corresponding to the second angles. Therefore, the quality of the image generated directly using the projection data $D_0$ corresponding to the first angles may be not as good as the quality of the image generated directly using the projection data corresponding to the second angles.

The first reconstruction module 420 may be configured to generate an image $F_1$ based on the projection data $D_0$ by way of, e.g., analytical reconstruction. The analytical reconstruction algorithm may include a filtered back projection (FBP) algorithm, a Feldkamp-Davis-Kress (FDK) algorithm based on the FBP algorithm, or the like, or any combination thereof.

In some embodiments, the FDK algorithm, which is a filtered back projection approximation reconstruction algorithm based on circular orbit scanning, may generate better tomographic images compared with other analytical reconstruction algorithms when the cone angle of the rays from the imaging device 110 is small (e.g., $\leq 5°$). The FDK algorithm may have other advantages, such as, a simple algorithm structure, a requirement of a simple mechanical movement of the imaging device 110 when a scan is performed, and high efficiency for image reconstruction, etc.

The projection data $D_0$ corresponding to the first angles is incomplete, because projection data corresponding to a part of the second angles is missing in the projection data $D_0$ compared to the projection data corresponding to the second angles. Therefore, the image quality of the image $F_1$ may be not as good as the image quality of the image generated directly using the projection data corresponding to the second angles. For example, there may be artifacts in the image $F_1$.

As used herein, the image $F_1$ may be a two-dimensional (2D) or three-dimensional (3D) matrix including a plurality of elements (e.g., pixels or voxels). Each of the plurality of elements in the matrix may have a value (also referred to as pixel/voxel value) representing a characteristic of the element. Exemplary characteristics may include luminance values, gray values, colors or RGB values, saturation values, or the like, or any combination thereof.

The determination module 430 may be configured to determine, based on the image $F_1$, projection data $D_1$ corresponding to third angles (also referred to as missing angles) that are a subset of the second angles and different from the first angles. For example, if θ is set to 20°, the second angles may include 0°, 1°, 2°, . . . , 199°, and 200°, the first angles may include 0°, 1°, 2°, . . . , 149°, and 150°, and the third angles may include 151°, 152°, 153°, . . . , 199°, and 200°. The projection data $D_1$ (also referred to as missing projection data) is determined by the processing device 140 based on the image $F_1$ instead of being acquired by the imaging device 110 by scanning the object at the third angles.

In some embodiments, the determination module 430 may use any suitable techniques to determine the projection data $D_1$ based on the image $F_1$, such as a forward projection algorithm.

The second reconstruction module 440 may be configured to generate a final image associated with the object based on the projection data $D_0$ and the projection data $D_1$. The second reconstruction module 440 may perform an iteration process including one or more iterations to generate the final image. In the iteration process, the second reconstruction module 440 may use initial data including the image $F_1$, the projection data D0, and the projection data $D_1$. The second reconstruction module 440 may use a total variation algorithm to improve the quality of the final image. The projection data $D_1$ may be updated in each iteration of the iteration process. Using the image $F_1$, the projection data D0, and the projection data $D_1$ as the initial data, the total variation algorithm, and/or updating the projection data $D_1$ may reduce the negative effect of missing projection data on the reconstruction of the final image, and/or improve the quality of the final image, and/or increase the speed of the reconstruction of the final image, which promotes the application of CBCT in clinical examinations and medical diagnoses.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 4A). The storage module may be configured to store data generated during any process performed by any component of in the processing device 140. As another example, each of components of the processing device 140 may include a storage device. Additionally or alternatively, the components of the processing device 140 may share a common storage device.

Figure 4B:
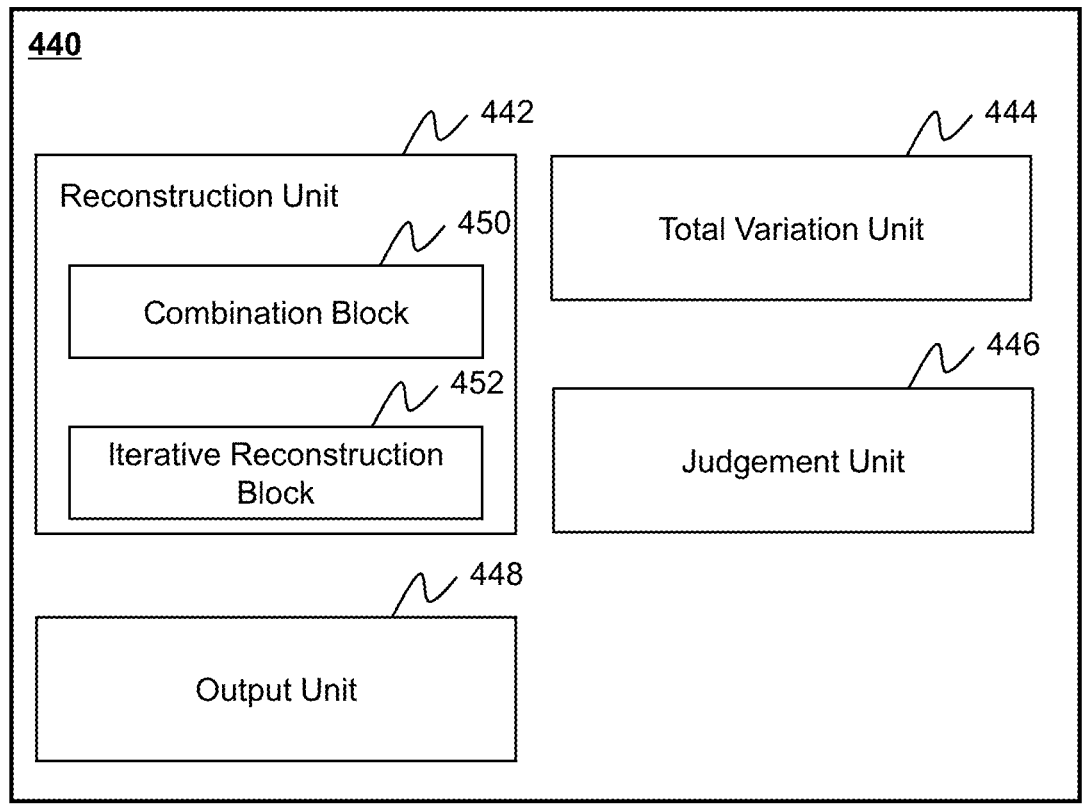
FIG. 4B is a block diagram illustrating an exemplary second reconstruction module according to some embodiments of the present disclosure.

FIG. 4B is a block diagram illustrating an exemplary second reconstruction module according to some embodiments of the present disclosure. The second reconstruction module 440 may include a reconstruction unit 442, a total variation unit 444, a judgement unit 446, and an output unit 448.

The reconstruction unit 442 may be configured to generate an image $F_{2i}$ based on the projection data $D_0$ and projection data $D_i$ corresponding to the third angles.

In some embodiments, the reconstruction unit 442 may include a combination block 450 and an iterative reconstruction block 452.

The combination block 450 may configured to combine the projection data $D_0$ and the projection data $D_i$ to determine a union of the projection data $D_0$ and the projection data $D_i$. The iterative reconstruction block 452 may be configured to generate the image $F_{2i}$ based on the union of the projection data $D_0$ and the projection data $D_i$.

In some embodiments, the reconstruction unit 442 may generate the image $F_{2i}$ based on the projection data $D_0$ and the projection data $D_i$ using any suitable techniques, such as an algebraic iterative algorithm. The algebraic iterative algorithm may include an algebraic reconstruction technique (ART), a simultaneous algebraic reconstruction technique (SART), or the like, or any combination thereof.

The total variation unit 444 may be configured to generate an image $F_{2i+1}$ based on the image $F_{2i}$. In some embodiments, in order to improve the image quality of the final image, the total variation unit 444 may optimize (e.g., denoise) the image $F_{2i}$ to generate the image $F_{2i+1}$. The total variation unit 444 may use any suitable techniques to generate the image $F_{2i+1}$, such as a total variation (TV) algorithm.

The total variation of an image may include gradients of pixels/voxels (gradients of pixels/voxels values at specific pixels/voxels including, e.g., luminance values, gray values, colors or RGB values, saturation values) in the image. The gradient of a pixel/voxel may be a vector and indicate a difference between pixel/voxel values of the pixel/voxel and other pixels/voxels adjacent to the pixel/voxel. In some embodiments, the total variation of an image may be related to the first-order derivative of the image.

Merely by way of example, the total variation unit 444 may determine a total variation norm of the image $F_{2i}$. In some embodiments, the more the noise included in the image $F_{2i}$ is, the larger the TV norm of the image $F_{2i}$ is. The total variation unit 444 may denoise the image $F_{2i}$ by determine a minimum total variation norm related to the image $F_{2i}$. The total variation unit 444 may determine an image corresponding to the minimum total variation norm as the image $F_{2i+1}$. The minimum total variation norm refers to a total variation norm corresponding to which an image includes noise less than a noise threshold. The minimum total variation norm may be default of the imaging system 100 or be set by a user of the imaging system 100.

The total variation unit 444 may use a steepest descent algorithm including a plurality of descending iterations to determine the minimum total variation norm. In each descending iteration, a decreasing TV norm and an image corresponding to/with the decreasing TV norm may be determined. The total variation unit 444 may determine an image corresponding to the minimum total variation norm as the image $F_{2i+1}$.

The total variation of an image may include gradients of pixels/voxels in the image. For example, in a medical image, the gradients of pixels/voxels on the boundary of different tissues are nonzero. After an image (e.g., the image $F_{2i}$) is generated using the SART iterative reconstruction, by processing the image using the total variation algorithm, an image (e.g., the image $F_{2i+1}$) with a higher quality may be generated from incomplete projection data. In additional, the noise of the reconstructed image (e.g., the image $F_{2i+1}$) may be effectively reduced and/or the speed of the iteration process of the process 600 may be increased.

The judgement unit 446 may be configured to determine whether the image $F_{2i+1}$ satisfies a termination condition. In response to a determination that the image $F_{2i+1}$ satisfies the termination condition, the output unit 448 may generate the final image based on the image $F_{2i+1}$; otherwise, the determination module 430 may determine projection data $D_{i+1}$ corresponding to the third angles based on the image $F_{2i+1}$.

In some embodiments, the judgement unit 446 may determine whether the difference between the projection data $D_{0i}$ corresponding to the first angles determined based on the image $F_{2i+1}$ and the projection data $D_0$ acquired by the imaging device 110 is less than a difference threshold. In this case, the termination condition may be the difference between the projection data $D_{0i}$ corresponding to the first angles determined based on the image $F_{2i+1}$ and the projection data $D_0$ acquired by the imaging device 110 is less than the difference threshold.

In some embodiments, the judgement unit 446 may use any suitable techniques to determine the projection data $D_{0i}$ based on the image $F_{2i+1}$, such as a forward projection algorithm.

In some embodiments, the judgement unit 446 may determine whether the count of iterations that have been performed is equal to a count threshold (e.g., 10 times, 20 times, 50 times, etc.). In this case, the termination condition may be the number of iterations that have been performed reaches to the number threshold.

The units/blocks in the second reconstruction module 440 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more blocks.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5A:
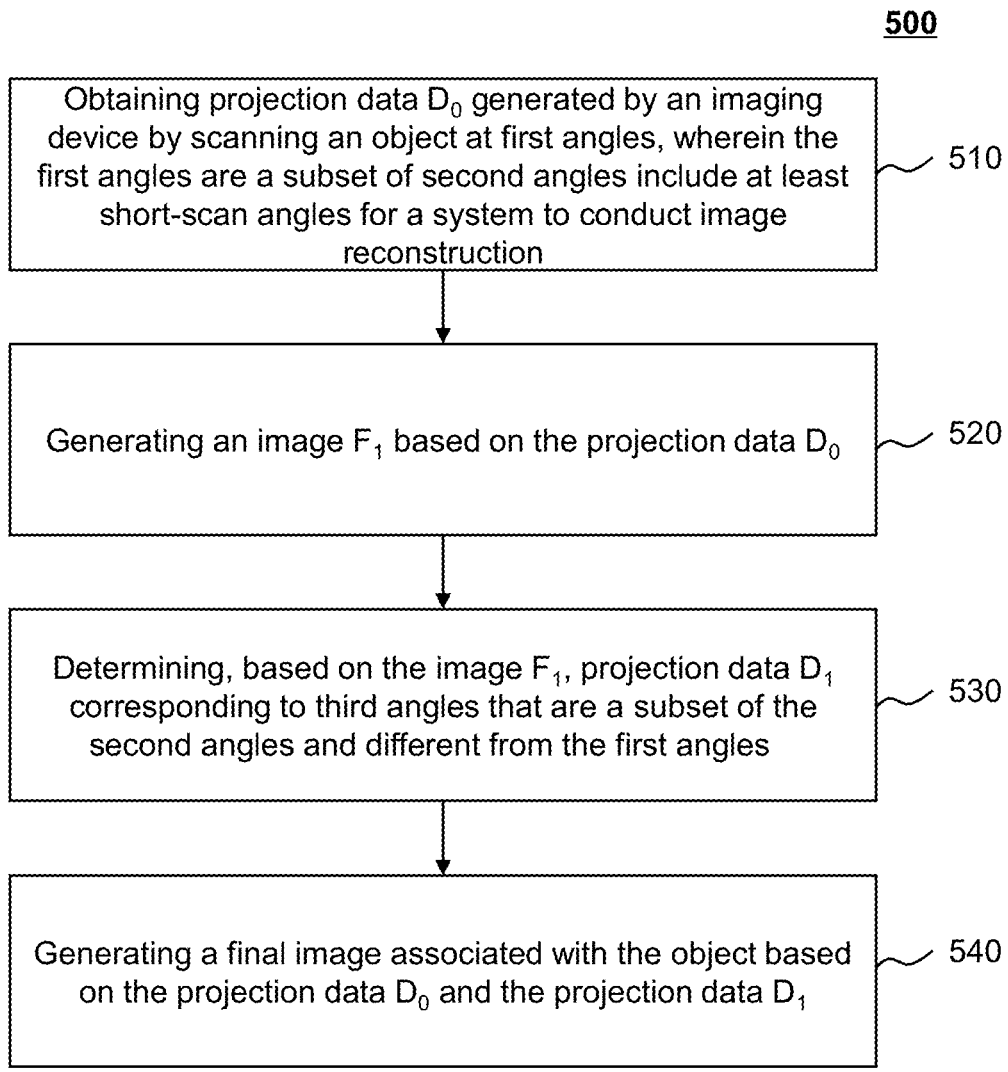
FIG. 5A is a flowchart illustrating an exemplary process for generating a final image according to some embodiments of the present disclosure.

FIG. 5A is a flowchart illustrating an exemplary process for generating a final image according to some embodiments of the present disclosure. In some embodiments, one or more operations of the process 500 illustrated in FIG. 5A may be implemented in the imaging system 100 illustrated in FIG. 1A. For example, the process 500 illustrated in FIG. 5A may be stored in a storage medium (e.g., the storage device 150, and/or the storage 220) of the imaging system 100 in the form of instructions, and invoked and/or executed by the processing device 140 (e.g., the processor 210 of the computing device 200 as illustrated in FIG. 2, or one or more modules/units/blocks of the processing device 140 illustrated in FIGS. 4A and 4B). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5A and described below is not intended to be limiting.

In 510, the processing device 140 (e.g., the acquisition module 410) may obtain projection data $D_0$. The projection data $D_0$ may be generated by the imaging device 110 by scanning an object at first angles, wherein the first angles may be a subset of second angles that include at least short-scan angles for the imaging system 100 to conduct image reconstruction.

During the scan process, the radiation source 116 of the imaging device 110 may rotate around the object and emit radiation rays (e.g., X-rays) at a plurality of angles. The rays may pass through the object and be received by the detector 114 of the imaging device 110. The detector 114 may transform light signals of the rays into electronic signals. The electronic signals may be transformed into digital signals (also referred to as projection data, raw data, or scan data), for example, by an analog-digital converter (ADC) of the imaging device 110. The imaging device 110 may transmit the digital signals to the processing device 140. The processing device 140 may process the digital signals to generate one or more images.

In some embodiments, if the imaging device 110 scans the object by rotating around the object and emitting radiation rays at angles in a range of at least 180°+θ (θ refers to a fan angle of the rays emitted from the radiation source 116 of the imaging device 110, and θ≥0°, the imaging device 110 may acquire complete projection data for medical image reconstruction of the imaging system 100. The angles in the range of at least 180°+θ may be referred to as complete angles (also referred to as the second angles) for medical image reconstruction of the imaging system 100. Angles within the range of 180°+θ may be referred to as the short-scan angles. The radiation emission may occur at second angles with an increment of less than or equal to 1°. For example, if θ is set to 20°, the second angles may include 0°, 1°, 2°, ..., 199°, and 200°.

The first angles (also referred to as limited angles or incomplete angles) may be a subset of the second angles. For example, if θ is set to 20°, the second angles may include 0°, 1°, 2°, ..., 199°, and 200°, and the first angles may include 0°, 1°, 2°, ..., 149°, and 150°. As another example, if θ is set to 20°, the second angles may include 0°, 1°, 2°, ..., 199°, and 200°, and the first angles may include 0°, 2°, 4°, ..., 198°, and 200°.

Figure 5B:
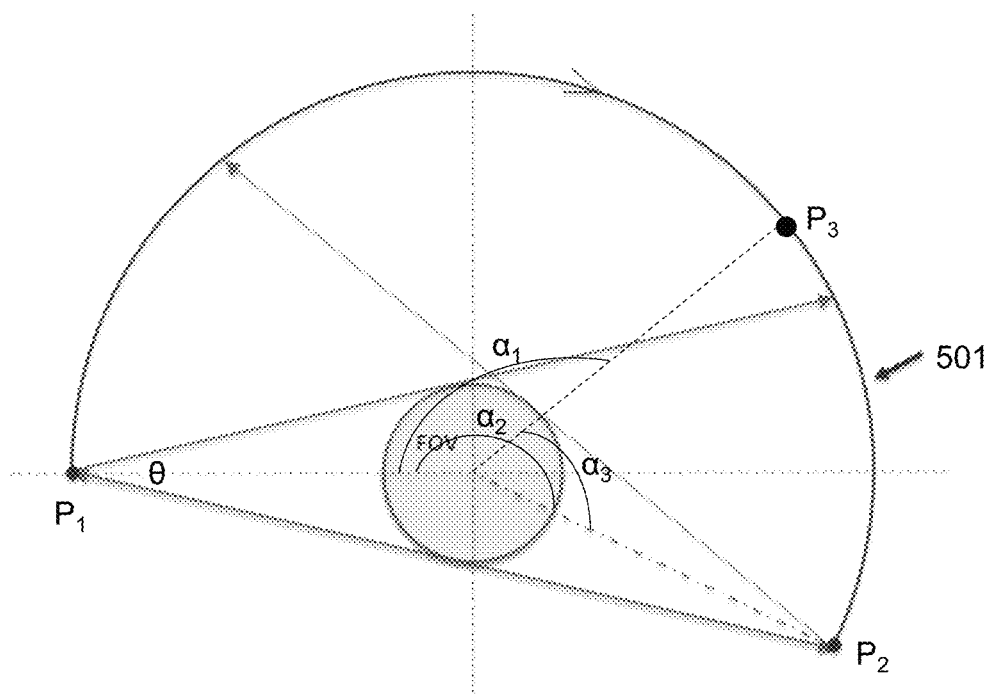
FIG. 5B is a schematic diagram illustrating exemplary first angles, second angles, and third angles according to some embodiments of the present disclosure.

In some embodiments, the radiation source 116 may rotate clockwise or anticlockwise together with the gantry 112. Merely by way of example, as shown in FIG. 5B, the radiation source 116 may rotate clockwise along 501. The second angles include angles within the range of $\alpha_2$ (e.g., 180°+θ). In this case, the radiation source 116 may rotate from position $P_1$ to position $P_2$. Position $P_1$ (e.g., the starting position) may be any position on the rotation path (e.g., 501) of the radiation source 116. For example, when the radiation source 116 is at position $P_1$, the line connecting the focal point of the radiation source 116 and the center point of the detector 114 may be horizontal or vertical relative to the floor. If the projection data $D_0$ is generated by the imaging device 110 by scanning the object at angles in the range of $\alpha_1$ (e.g., in this case, the radiation source 116 rotates from position $P_1$ to position $P_3$), angles within the range of $\alpha_1$ may be referred to as the first angles.

In some embodiments, the radiation received by the object when the imaging device 110 scans the object by emitting radiation rays at the first angles (or referred to as scanning at the first angles for brevity) may be less than the radiation received by the object when the imaging device 110 scans the object by emitting radiation rays at the second angles (or referred to as scanning at the second angles for brevity). However, because of the projection data $D_0$ (also referred to incomplete projection data) corresponding to the first angles, projection data corresponding to a part of the second angles is missing compared to the projection data corresponding to the second angles. Therefore, the quality of the image generated directly using the projection data $D_0$ corresponding to the first angles may be not as good as the quality of the image generated directly using the projection data corresponding to the second angles.

In 520, the processing device 140 (e.g., the first reconstruction module 420) may generate an image $F_1$ based on the projection data $D_0$ by way of, e.g., analytical reconstruction. The analytical reconstruction algorithm may include a filtered back projection (FBP) algorithm, a Feldkamp-Davis-Kress (FDK) algorithm based on the FBP algorithm, or the like, or any combination thereof.

In some embodiments, the FDK algorithm, which is a filtered back projection approximation reconstruction algorithm based on circular orbit scanning, may generate better tomographic images compared with other analytical reconstruction algorithms when the cone angle of the rays from the imaging device 110 is small (e.g., ≤5°. The FDK algorithm may have other advantages, such as, a simple algorithm structure, a requirement of a simple mechanical movement of the imaging device 110 when a scan is performed, and/or high efficiency for image reconstruction, etc.

The projection data $D_0$ corresponding to the first angles is incomplete, because projection data corresponding to a part of the second angles is missing in the projection data $D_0$ compared to the projection data corresponding to the second angles. Therefore, the image quality of the image $F_1$ may be not as good as the image quality of the image generated directly using the projection data corresponding to the second angles. For example, there may be artifacts in the image $F_1$.

As used herein, the image $F_1$ may be a two-dimensional (2D) or three-dimensional (3D) matrix including a plurality of elements (e.g., pixels or voxels). Each of the plurality of elements in the matrix may have a value (also referred to as pixel/voxel value) representing a characteristic of the element. Exemplary characteristics may include luminance values, gray values, colors or RGB values, saturation values, or the like, or any combination thereof.

In 530, the processing device 140 (e.g., the determination module 430) may determine, based on the image $F_1$, the projection data $D_1$ corresponding to third angles (also referred to as missing angles) that are a subset of the second angles and different from the first angles. Merely by way of example, as shown in FIG. 5B, the second angles refer to angles within a range of $\alpha_2$ (e.g., 180°θ). If the projection data $D_0$ is generated by the imaging device 110 by scanning the object at angles in a range of $\alpha_1$ (e.g., in this case, the radiation source 116 rotates from position $P_1$ to position $P_3$), angles within the range of $\alpha_1$ may be referred to as the first angles. Angles within the range of $\alpha_3$ may be referred to as the third angles. For example, if θ is set to 20°, the second angles may include 0°, 1°, 2°, ..., 199°, and 200°, the first angles may include 0°, 1°, 2°, ..., 149°, and 150°, and the third angles may include 151°, 152°, 153°, ..., 199°, and 200°. The projection data $D_1$ (also referred to as missing projection data) is determined by the processing device 140 based on the image $F_1$ instead of being acquired by the imaging device 110 by scanning the object at the third angles.

In some embodiments, the processing device 140 may use any suitable techniques to determine the projection data $D_1$ based on the image $F_1$, such as a forward projection algorithm.

In 540, the processing device 140 (e.g., the second reconstruction module 440) may generate a final image associated with the object based on the projection data $D_0$ and the projection data $D_1$. The processing device 140 may perform an iteration process including one or more iterations to generate the final image. In the iteration process, the processing device 140 may use initial data including the image $F_1$, the projection data D0, and the projection data $D_1$. The processing device 140 may use a total variation algorithm to improve the quality of the final image. The projection data $D_1$ may be updated in each iteration of the iteration process. Using the image $F_1$, the projection data D0, and the projection data $D_1$ as the initial data, the total variation algorithm, and/or updating the projection data $D_1$ may reduce the negative effect of missing projection data on the reconstruction of the final image, and/or improve the quality of the final image, and/or increase the speed of the reconstruction of the final image, which promotes the application of CBCT in clinical examinations and medical diagnoses. Details regarding the generation of the final image may be found elsewhere in the present disclosure (e.g., the description in connection with FIG. 6).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
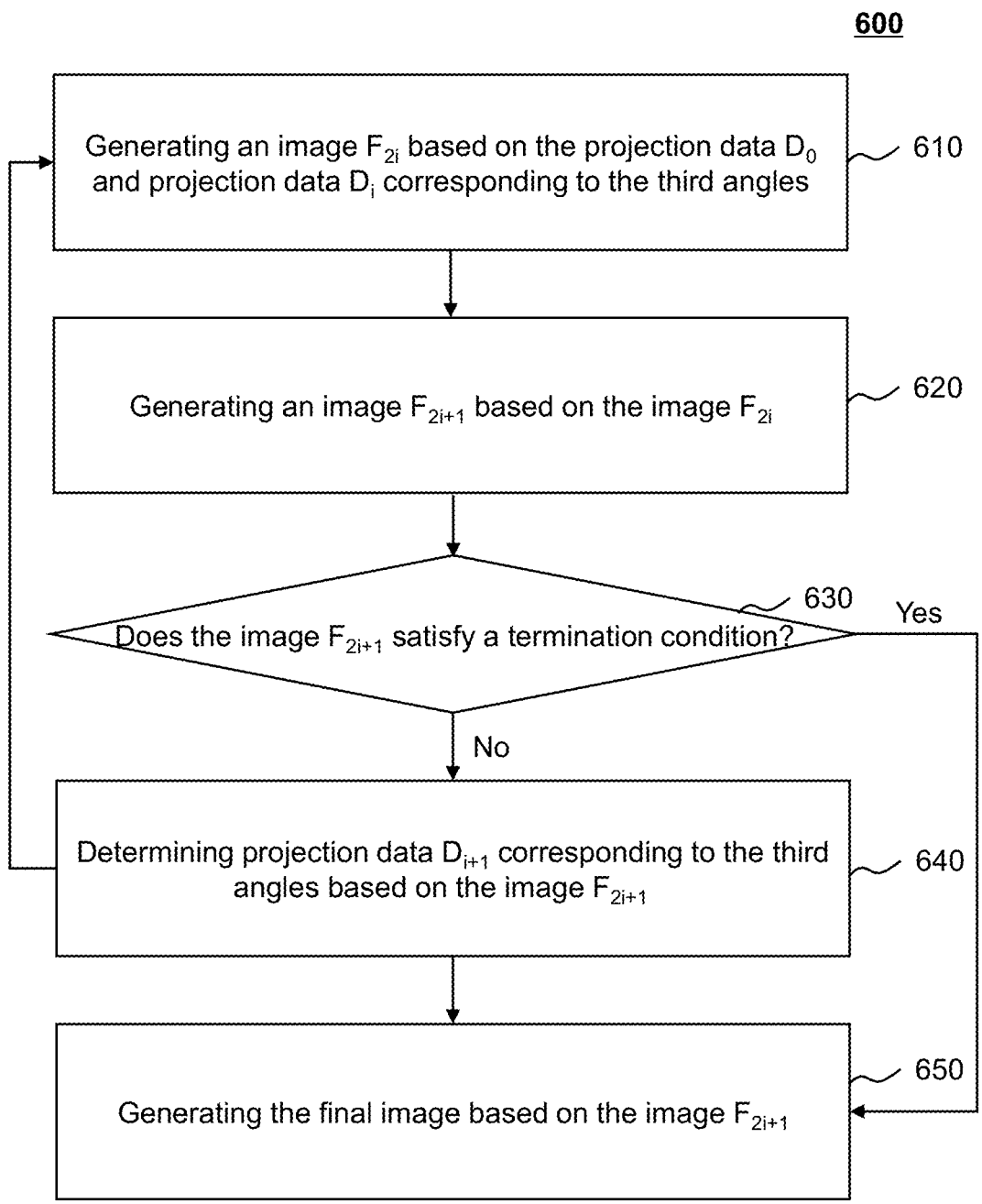
FIG. 6 is a flowchart illustrating an exemplary process for generating a final image according to some embodiments of the present disclosure.

FIG. 6 is a flowchart illustrating an exemplary process for generating a final image according to some embodiments of the present disclosure. In some embodiments, one or more operations of the process 600 illustrated in FIG. 6 may be implemented in the imaging system 100 illustrated in FIG. 1A. For example, the process 600 illustrated in FIG. 6 may be stored in a storage medium (e.g., the storage device 150, and/or the storage 220) of the imaging system 100 in the form of instructions, and invoked and/or executed by the processing device 140 (e.g., the processor 210 of the computing device 200 as illustrated in FIG. 2, or one or more modules/units/blocks of the processing device 140 illustrated in FIGS. 4A and 4B). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 540 of the process 500 in FIG. 5A may be performed based on the process 600.

In some embodiments, the processing device 140 may perform an iteration process including one or more iterations (e.g., at least one iteration of the one or more iterations may include operations 610-640 of the process 600) to generate a final image. For brevity, the description of the iteration process for generating the final image may take an $i_{th}$ (e.g., i is an integer and greater than 0) iteration of the one or more iterations as an example. Other iterations of the one or more iterations may be similar to the $i_{th}$ iteration.

In 610, the processing device 140 (e.g., the second reconstruction module 440 and/or the reconstruction unit 442) may generate an image $F_{2i}$ based on the projection data $D_0$ corresponding to the first angles and projection data $D_i$ corresponding to the third angles. In the first iteration (e.g., i=1) of the one or more iterations, the projection data $D_i$ may be the projection data $D_1$. In other iterations (e.g., i≥2) of the one or more iterations, the projection data $D_i$ may be the projection data corresponding to the third angles determined in a previous iteration (e.g., the $(i-1)_{th}$ iteration).

In some embodiments, the processing device 140 (e.g., the second reconstruction module 440, the reconstruction unit 442, and/or the combination block 450) may combine the projection data $D_0$ and the projection data $D_i$ to determine a union of the projection data $D_0$ and the projection data $D_i$. The processing device 140 (e.g., the second reconstruction module 440, the reconstruction unit 442, and/or the iterative reconstruction block 452) may generate the image $F_{2i}$ based on the union of the projection data $D_0$ and the projection data $D_i$.

In some embodiments, the processing device 140 may generate the image $F_{2i}$ based on the projection data $D_0$ and the projection data $D_i$ using any suitable techniques, such as an algebraic iterative algorithm. The algebraic iterative algorithm may include an algebraic reconstruction technique (ART), a simultaneous algebraic reconstruction technique (SART), or the like, or any combination thereof.

For example, in SART, a SART formula may be represented based on Equation (1) below:

$$f_{n+1}^{SART} = f_n + \beta M^T \frac{Mf_n - P}{M^T * M}, \quad (1)$$

where M denotes a projection matrix related to the imaging device 110, $M^T$ denotes a transpose of the projection matrix M, P denotes projection data corresponding to the second angles (e.g., the union of the projection data $D_0$ and the projection data $D_i$), β denotes a relaxation factor, n denotes an iteration count of the SART reconstruction algorithm, n>0, and $f_n$ denotes a result of the SART formula in the $n_{th}$ iteration of the SART reconstruction algorithm, and $f_{n+1}^{SART}$ denotes a result of the SART formula in the $(n+1)_{th}$ iteration of the SART reconstruction algorithm.

The processing device 140 may transform Equation (1) to Equation (2) below to generate the image $F_{2i}$:

$$F_{2i} = F_{2i-1} + \beta M^T \frac{MF_{2i-1} - P}{M^T * M}, \quad (2)$$

where $F_{2i-1}$ denotes an image generated in a previous iteration (e.g., in operation 620 in the $(i-1)_{th}$ iteration, i≥2) of the one or more iterations of the process 600.

In some embodiments, in the first iteration (e.g., i=1) of the one or more iterations of the process 600, the processing device 140 may determine generate the image $F_2$ based on Equation (3) below:

$$F_2 = F_1 + \beta M^T \frac{MF_1 - P}{M^T * M}, \quad (3)$$

where P denotes projection data corresponding to the second angles (e.g., the union of the projection data $D_0$ and the projection data $D_1$).

In some embodiments, the image $F_1$ and/or the projection data $D_1$ is used as the initial data in the algebraic iterative algorithm (e.g., the SART), which may speed up the iteration process by reducing the number of iterations of the process 600 needed for generating the final image.

In 620, the processing device 140 (e.g., the second reconstruction module 440 and/or the total variation unit 444) may generate an image $F_{2i+1}$ based on the image $F_{2i}$. In some embodiments, in order to improve the image quality of the final image, the processing device 140 may optimize (e.g., denoise) the image $F_{2i}$ to generate the image $F_{2i+1}$. The processing device 140 may use any suitable techniques to generate the image $F_{2i+1}$, such as a total variation (TV) algorithm.

The total variation of an image may include gradients of pixels/voxels (gradients of pixels/voxels values at specific pixels/voxels including, e.g., luminance values, gray values, colors or RGB values, saturation values) in the image. The gradient of a pixel/voxel may be a vector and indicate a difference between pixel/voxel values of the pixel/voxel and other pixels/voxels adjacent to the pixel/voxel. In some embodiments, the total variation of an image may be related to the first-order derivative of the image.

Merely by way of example, the processing device 140 may determine a total variation norm of the image $F_{2i}$. In some embodiments, the more the noise included in the image $F_{2i}$ is, the larger the TV norm of the image $F_{2i}$ is. The processing device 140 may denoise the image $F_{2i}$ by determine a minimum total variation norm of the image $F_{2i}$. The processing device 140 may determine an image corresponding to/with the minimum total variation norm as the image $F_{2i+1}$. The minimum total variation norm refers to a total variation norm corresponding to an image including noise less than a noise threshold. The minimum total variation norm may be default of the imaging system 100 or be set by a user of the imaging system 100.

For example, the processing device 140 may determine the total variation norm of the image $F_{2i}$ based on Equation (4) below:

$$\|\nabla F\|_{TV} = \Sigma_{s,t} |\vec{\nabla} f_{s,t}| = \Sigma_{s,t} \sqrt{(f_{s,t} - f_{s,t-1})^2 + (f_{s,t} - f_{s-1,t})^2}, \quad (4)$$

where F denotes an image (e.g., the image $F_{2i}$), $f_{s,t}$ denotes a pixel or voxel value of a pixel or voxel in the image, s denotes the index value (e.g., a coordinate) of a row in the image that the pixel/voxel $f_{s,t}$ locates in, t denotes the index value (e.g., a coordinate) of a column in the image that the pixel/voxel $f_{s,t}$ locates in, ∇ denotes an operation for determine a gradient of an image, ∇F refers to the gradient of image F (e.g., the image $F_{2i}$), | | denotes an operation for an absolute value, ‖ ‖ denotes an operation of the norm (e.g., 1-norm, 2-norm, or infinity norm), $\|\nabla f\|_{TV}$ denotes the TV norm of the image, $(f_{s,t}-f_{s,t-1})$ denotes a gradient of the pixel or voxel along the column direction of the image, and $(f_{s,t}-f_{s-1,t})$ denotes a gradient of the pixel or voxel along the row direction of the image, $\vec{\nabla}$ refers to an operation for determining a gradient vector of a pixel or voxel, and $\vec{\nabla} f_{s,t}$ refers to a gradient vector of $f_{s,t}$.

The processing device 140 may use a steepest descent algorithm including a plurality of descending iterations to determine the minimum total variation norm. In each descending iteration, a decreasing TV norm and an image corresponding to/with the decreasing TV norm may be determined. The processing device 140 may determine an image corresponding to/with the minimum total variation norm as the image $F_{2i+1}$. For example, the processing device 140 may determine the minimum total variation norm based on Equation (5) below:

$$f_{n+1,m+1}^{TV} = f_{n+1,m}^{TV} - \alpha_m \nabla \|\nabla f_{n+1,m}^{TV}\|_{l1}, \qquad (5)$$

where m denotes the iteration count of descending iterations (e.g., the m times of descending iterations may be included in a iteration of the process 600), m>0, $f_{n+1,m}^{TV}$ denotes a result (e.g., an image) of the $m_{th}$ descending iteration performed to a result (e.g., the image $F_{2i}$) of operation 610 in the $i_{th}$ iteration of the process 600 (e.g., the $(n+1)_{th}$ iteration of the SART), $\alpha_m$ denotes a descending step size of the $m_{th}$ descending iteration, and $\|\nabla f_{n+1,m}^{TV}\|_{l1}$ denotes the TV norm (e.g., 1-norm) of $f_{n+1,m}^{TV}$.

In some embodiments, m may be set to any number. For example, m may be set to 30. If no minimum total variation norm related to the image $F_{2i}$ is identified in the 30 times of descending iterations, an image corresponding to the total variation norm of the last descending iteration (e.g., the 30th descending iteration) may be designated as the image $F_{2i+1}$. If the count of the descending iterations that have been performed is less than or equal to 30 and the minimum total variation norm is identified at the current descending iteration, the descending iteration process may be terminated.

In some embodiments, if a difference between the TV norms determined in the current descending iteration and its immediately preceding descending iteration is less than a TV difference threshold, an image corresponding to the TV norms determined in the current descending iteration may be designated as the image $F_{2i+1}$. The descending iteration process may be terminated.

Because the steepest descent algorithm uses the opposite direction of the gradient of the image $F_{2i}$ as the search direction, the closer the proceeding of the steepest descent algorithm is to the target value (e.g., the minimum total variation norm), the smaller the step size of the steepest descent algorithm is, and accordingly the slower the proceeding is.

The total variation of an image may include gradients of pixels or voxels in the image. For example, in a medical image, the gradients of pixels or voxels on the boundary of different tissues are nonzero. After an image (e.g., the image $F_{2i}$) is generated using the SART iterative reconstruction, by processing the image using the total variation algorithm, an image (e.g., the image $F_{2i+1}$) with a higher quality may be generated from incomplete projection data. In additional, the noise of the reconstructed image (e.g., the image $F_{2i+1}$) may be effectively reduced and the speed of the iteration process of the process 600 may be increased.

In 630, the processing device 140 (e.g., the second reconstruction module 440 and/or the judgement unit 446) may determine whether the image $F_{2i+1}$ satisfies a termination condition. In response to a determination that the image $F_{2i+1}$ satisfies the termination condition, the process 600 may proceed to operation 650, in which the processing device 140 (e.g., the second reconstruction module 440 and/or the output unit 448) may generate the final image based on the image $F_{2i+1}$; otherwise, the process 600 may proceed to operation 640, in which the processing device 140 may determine projection data $D_{i+1}$ corresponding to the third angles based on the image $F_{2i+1}$. In some embodiments, the processing device 140 may perform operation 640 based on operation 530 of the process 500 in FIG. 5A.

In some embodiments, the processing device 140 may determine whether the difference between the projection data $D_{0i}$ corresponding to the first angles determined based on the image $F_{2i+1}$ and the projection data $D_0$ acquired by the imaging device 110 is less than a difference threshold. In this case, the termination condition may be the difference between the projection data $D_{0i}$ corresponding to the first angles determined based on the image $F_{2i+1}$ and the projection data $D_0$ acquired by the imaging device 110 is less than the difference threshold.

In some embodiments, the processing device 140 may use any suitable techniques to determine the projection data $D_{0i}$ based on the image $F_{2i+1}$, such as a forward projection algorithm.

For example, in an iteration of the one or more iterations of the process 600, after operation 610 (e.g., an SART iteration), the processing device 140 may perform the total variation algorithm including X (X is a positive integer) times or rounds of descending iterations to minimize the total variation norm of the image (e.g., the image $F_{2i}$) reconstructed in operation 610. In this case, the termination condition may be represented by Equation (6) below:

$$\min\|\nabla f\|_{l1} \text{ subject to } \|Mf-P1\|_2^2 < \varepsilon, \qquad (6)$$

where f refers to the image $F_{2i+1}$, M refers to the projection matrix related to the imaging device 110, Mf refers to the projection data $D_{0i}$, P1 refers to the projection data $D_0$, $\varepsilon$ denotes the difference threshold (e.g., an acceptable difference related to the imaging system 100 between the projection data $D_0$ and the projection data $D_{0i}$).

In some embodiments, the processing device 140 may determine whether the count of iterations that have been performed is equal to a count threshold (e.g., 10 times, 20 times, 50 times, etc.). In this case, the termination condition may be the number of iterations that have been performed is equal to the number threshold.

For the purpose of illustration, the following specific examples are used to illustrate the iterations of the iteration process for generating the final image:

The first iteration:

First, the image $F_1$ generated based on the projection data $D_0$ corresponding to the first angles (e.g., the incomplete gantry angles) acquired by the imaging device 110 may be used as the initial data to determine the projection data $D_1$ corresponding to the third angles (e.g., the missing gantry angles). Secondly, the processing device 140 may perform the first iteration reconstruction to generate the image $F_2$ based on the projection data $D_0$ and the projection data $D_1$. Then, the processing device 140 may determine the total variation norm of the image $F_2$ and determine an image corresponding to the minimum total variation norm as the image $F_3$. Finally, the processing device 140 may determine whether the image $F_3$ satisfies the termination condition. If the image $F_3$ satisfies the termination condition, the image $F_3$ may be used as the final image; otherwise, the processing device 140 may determine the projection data $D_2$ corresponding to the third angles based on the image $F_3$ and perform a second iteration.

The second iteration:

First, the processing device 140 may perform the second iteration reconstruction to generate the image $F_4$ based on the projection data $D_0$ and the projection data $D_2$. Secondly, the processing device 140 may determine the total variation norm of the image $F_4$ and determine an image corresponding to the minimum total variation norm as an image $F_5$. Finally, the processing device 140 may determine whether the image $F_5$ satisfies the termination condition. If the image $F_5$ satisfies the termination condition, the image $F_5$ may be used as the final image; otherwise, the processing device 140 may determine the projection data $D_3$ corresponding to the third angles based on the image $F_5$ and perform a third iteration.

The third iteration:

First, the processing device 140 may perform the third iteration reconstruction to generate the image $F_6$ based on the projection data $D_0$ and the projection data $D_3$. Secondly, the processing device 140 may determine the total variation norm of the image $F_6$ and determine an image corresponding to the minimum total variation norm as an image $F_7$. Finally, the processing device 140 may determine whether the image $F_7$ satisfies the termination condition. If the image $F_7$ satisfies the termination condition, the image $F_7$ may be used as the final image; otherwise, the processing device 140 may determine the projection data $D_4$ corresponding to the third angles based on the image $F_7$ and perform a fourth iteration.

. . . .

The $i_{th}$ ($i \geq 4$) iteration:

First, the processing device 140 may perform the $i_{th}$ iteration reconstruction to generate the image $F_{2i}$ based on the projection data $D_0$ and the projection data $D_i$. Secondly, the processing device 140 may determine the total variation norm of the image $F_{2i}$ and determine an image corresponding to the minimum total variation norm as an image $F_{2i+1}$. Finally, the processing device 140 may determine whether the image $F_{2i+1}$ satisfies the termination condition. If the image $F_{2i+1}$ satisfies the termination condition, the image $F_{2i+1}$ may be used as the final image; otherwise, the processing device 140 may determine the projection data $D_{i+1}$ corresponding to the third angles based on the image $F_{2i+1}$ and perform an $(i+1)_{th}$ iteration.

In short, the processing device 140 may sequentially perform the first to the $i_{th}$ iteration as described above until the image $F_{2i+1}$ satisfies the termination condition, and then the iteration process of the process 600 may be terminated, wherein $1 \leq i \leq n$, i and n are positive integers, and n refers to the number threshold.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, one or more modules illustrated in FIG. 6 may be implemented in at least part of the exemplary system as illustrated in FIGS. 1A and 1B.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for image reconstruction, comprising:
at least one storage device including a set of instructions;
at least one processor in communication with the at least one storage device, wherein when executing the set of instructions, the at least one processor is directed to cause the system to perform operations including:
   obtaining projection data $D_0$ generated by an imaging device by scanning an object at first angles, wherein the first angles are a subset of second angles, the second angles being short-scan angles for the system to conduct image reconstruction, and the first angles being incomplete angles;
   generating an image $F_1$ based on the projection data $D_0$;
   determining, based on the image $F_1$, projection data $D_1$ corresponding to third angles that are a subset of the second angles and different from the first angles, wherein the third angles are missing angles, and the union of the first angles and the third angles forms the second angles; and
generating a final image associated with the object by performing an iteration process including one or more iterations using initial data including the image $F_1$, the projection data $D_0$, and the projection data $D_1$, wherein an $i_{th}$ iteration of the one or more iterations includes:
   generating an image $F_{2i}$ by reconstructing the projection data $D_0$ and projection data $D_i$ corresponding to the third angles;
   generating an image $F_{2i+1}$ based on the image $F_{2i}$;
   determining projection data $D_{i+1}$ corresponding to the third angles based on the image $F_{2i+1}$;
   determining whether the image $F_{2i+1}$ satisfies a termination condition; and
   in response to determining that the image $F_{2i+1}$ satisfies the termination condition, designating the image $F_{2i+1}$ as the final image, wherein the determining of whether the image $F_{2i+1}$ satisfies the termination condition includes:
      determining projection data $D_{0i}$ corresponding to the first angles based on the image $F_{2i+1}$;
      determining a difference between the projection data $D_{0i}$ and the projection data $D_0$; and
      determining whether the difference between the projection data $D_{0i}$ and the projection data $D_0$ is less than a difference threshold, wherein the termination condition includes that the difference between the projection data $D_{0i}$ and the projection data $D_0$ is less than the difference threshold.

2. The system of claim 1, wherein the determining of the projection data $D_{i+1}$ corresponding to the third angles includes:
determining the projection data $D_{i+1}$ based on the image $F_{2i+1}$ using a forward projection algorithm.

3. The system of claim 1, wherein the image $F_{2i}$ is generated based on the projection data $D_0$ and projection data $D_i$ using an algebraic iterative algorithm.

4. The system of claim 1, wherein the generating of the image $F_{2i+1}$ based on the image $F_{2i}$ includes:
generating the image $F_{2i+1}$ by minimizing a total variation (TV) relating to the image $F_{2i}$.

5. The system of claim 4, wherein minimizing the TV relating to the image $F_{2i}$ is via a steepest descent algorithm.

6. The system of claim 1, wherein to generate the image $F_1$ based on the projection data $D_0$, the at least one processor is directed to cause the system to performing additional operations including:
generating the image $F_1$ based on the projection data $D_0$ using an analytical reconstruction algorithm.

7. The system of claim 1, wherein the system is a Cone-beam imaging system at least including a CBCT system at least including a C-arm X-ray fluoroscopy system.

8. A method for image reconstruction implemented on a computing device including at least one storage device and at least one processor, comprising:
obtaining projection data $D_0$ generated by an imaging device by scanning an object at first angles, wherein the first angles are a subset of second angles, the second angles being short-scan angles for a system to conduct image reconstruction, and the first angles being incomplete angles;
generating an image $F_1$ based on the projection data $D_0$;
determining, based on the image $F_1$, projection data $D_1$ corresponding to third angles that are a subset of the second angles and different from the first angles, wherein the third angles are missing angles, and the union of the first angles and the third angles forms the second angles; and
generating a final image associated with the object by performing an iteration process including one or more iterations using initial data including the image $F_1$, the projection data $D_0$, and the projection data $D_1$, wherein an $i_{th}$ iteration of the one or more iterations includes:
generating an image $F_{2i}$ by reconstructing the projection data $D_0$ and projection data $D_i$ corresponding to the third angles;
generating an image $F_{2i+1}$ based on the image $F_{2i}$; and
determining projection data $D_{i+1}$ corresponding to the third angles based on the image $F_{2i+1}$;
determining whether the image $F_{2i+1}$ satisfies a termination condition; and
in response to determining that the image $F_{2i+1}$ satisfies the termination condition, designating the image $F_{2i+1}$ as the final image, wherein the determining of whether the image $F_{2i+1}$ satisfies the termination condition includes:
determining projection data $D_{0i}$ corresponding to the first angles based on the image $F_{2i+1}$;
determining a difference between the projection data $D_{0i}$ and the projection data $D_0$; and
determining whether the difference between the projection data $D_{0i}$ and the projection data $D_0$ is less than a difference threshold, wherein the termination condition includes that the difference between the projection data $D_{0i}$ and the projection data $D_0$ is less than the difference threshold.

9. The method of claim 8, wherein the determining of projection data $D_{i+1}$ corresponding to the third angles includes:
determining the projection data $D_{i+1}$ based on the image $F_{2i+1}$ using a forward projection algorithm.

10. The method of claim 8, wherein the image $F_{2i}$ is generated based on the projection data $D_0$ and projection data $D_i$ using an algebraic iterative algorithm.

11. The method of claim 8, wherein the generating of the image $F_{2i+1}$ based on the image $F_{2i}$ includes:
generating the image $F_{2i+1}$ by minimizing a total variation (TV) relating to the image $F_{2i}$.

12. The method of claim 11, wherein minimizing the TV relating to the image $F_{2i}$ is via a steepest descent algorithm.

13. The method of claim 8, wherein the generating of the image $F_1$ based on the projection data $D_0$ includes:
generating the image $F_1$ based on the projection data $D_0$ using an analytical reconstruction algorithm.

14. A non-transitory computer readable medium, comprising at least one set of instructions for image reconstruction, wherein when executed by one or more processors of a computing device, the at least one set of instructions causes the computing device to perform a method, the method comprising:
obtaining projection data $D_0$ generated by an imaging device by scanning an object at first angles, wherein the first angles are a subset of second angles, the second angles being short-scan angles for a system to conduct image reconstruction, and the first angles being incomplete angles;
generating an image $F_1$ based on the projection data $D_0$;
determining, based on the image $F_1$, projection data $D_1$ corresponding to third angles that are a subset of the second angles and different from the first angles, wherein the third angles are missing angles, and the union of the first angles and the third angles forms the second angles; and
generating a final image associated with the object by performing an iteration process including one or more iterations using initial data including the image $F_1$, the projection data $D_0$, and the projection data $D_1$, wherein an $i_{th}$ iteration of the one or more iterations includes:
generating an image $F_{2i}$ by reconstructing the projection data $D_0$ and projection data $D_i$ corresponding to the third angles;
generating an image $F_{2i+1}$ based on the image $F_{2i}$;
determining projection data $D_{i+1}$ corresponding to the third angles based on the image $F_{2i+1}$;
determining whether the image $F_{2i+1}$ satisfies a termination condition; and
in response to determining that the image $F_{2i+1}$ satisfies the termination condition, designating the image $F_{2i+1}$ as the final image, wherein the determining of whether the image $F_{2i+1}$ satisfies the termination condition includes:
determining projection data $D_{0i}$ corresponding to the first angles based on the image $F_{2i+1}$;
determining a difference between the projection data $D_{0i}$ and the projection data $D_0$; and
determining whether the difference between the projection data $D_{0i}$ and the projection data $D_0$ is less than a difference threshold, wherein the termination condition includes that the difference between the projection data $D_{0i}$ and the projection data $D_0$ is less than the difference threshold.

* * * * *